United States Patent
Bryner et al.

(10) Patent No.: US 7,235,122 B2
(45) Date of Patent: Jun. 26, 2007

(54) FILTRATION MEDIA FOR FILTERING PARTICULATE MATERIAL FROM GAS STREAMS

(75) Inventors: Michael Allen Bryner, Midlothian, VA (US); Joseph Brian Hovanec, Richmond, VA (US); David C. Jones, Midlothian, VA (US); Hyun Sung Lim, Midlothian, VA (US); B. Lynne Wiseman, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 327 days.

(21) Appl. No.: 10/983,513

(22) Filed: Nov. 8, 2004

(65) Prior Publication Data

US 2006/0096260 A1    May 11, 2006

(51) Int. Cl.
*B01D 46/00* (2006.01)
(52) U.S. Cl. ............................ 95/287; 95/273; 55/486; 55/487; 55/527; 55/528
(58) Field of Classification Search ............. 55/486, 55/487, 527, 528, 490–511; 95/273, 286, 95/287
See application file for complete search history.

(56) References Cited

U.S. PATENT DOCUMENTS

| 2,797,163 | A |   | 6/1957  | Smith et al. |
| 3,228,825 | A |   | 1/1966  | Waggoner |
| 3,240,663 | A |   | 3/1966  | Raczek |
| 3,249,491 | A |   | 5/1966  | Young et al. |
| 3,253,978 | A |   | 5/1966  | Bodendorf et al. |
| 3,375,155 | A |   | 3/1968  | Adams |
| 3,882,135 | A |   | 5/1975  | Pews et al. |
| 4,178,157 | A |   | 12/1979 | van Turnhout et al. |
| 4,650,506 | A | * | 3/1987  | Barris et al. .................. 55/487 |
| 4,874,659 | A |   | 10/1989 | Ando et al. |
| 5,804,512 | A | * | 9/1998  | Lickfield et al. ............ 442/346 |
| 6,419,839 | B1 | * | 7/2002 | Cox et al. .................... 210/764 |
| 6,604,925 | B1 |   | 8/2003 | Dubson |
| 6,716,274 | B2 |   | 4/2004 | Gogins et al. |
| 6,746,517 | B2 |   | 6/2004 | Benson et al. |
| 6,858,057 | B2 | * | 2/2005 | Healey ......................... 55/528 |
| 6,933,252 | B2 | * | 8/2005 | Pierce .......................... 442/327 |
| 7,138,057 | B2 | * | 11/2006 | Debes et al. ............ 210/500.36 |
| 2002/0073667 | A1 |   | 6/2002 | Barris et al. |
| 2004/0038014 | A1 | * | 2/2004 | Schaefer et al. ............ 428/220 |
| 2004/0134353 | A1 | * | 7/2004 | Gillingham et al. .......... 95/273 |
| 2004/0266300 | A1 | * | 12/2004 | Isele et al. .................. 442/327 |

FOREIGN PATENT DOCUMENTS

| WO | WO 01/20133 A1 | 3/2001 |
| WO | WO 02/20132 A2 | 3/2002 |
| WO | WO 02/20132 A3 | 3/2002 |
| WO | WO 03/080905 A1 | 10/2003 |
| WO | WO 2004/027140 A1 | 4/2004 |

\* cited by examiner

*Primary Examiner*—Frank Lawrence
*Assistant Examiner*—Robert Clemente

(57) ABSTRACT

Filtration media are disclosed for use in high efficiency air filters for filtering particulate matter in air. The media make use of at least one layer of fibers having a diameter less than 1000 nanometers sandwiched between two scrim layers to achieve high efficiency particulate air (HEPA) filtration performance at relatively low pressure drops.

19 Claims, 1 Drawing Sheet

FILTRATION MEDIA FOR FILTERING PARTICULATE MATERIAL FROM GAS STREAMS

BACKGROUND OF THE INVENTION

The present invention relates to filtration media for use in high efficiency air filters, for filtering particulate material from gas streams.

High efficiency particulate air (HEPA) level performance is critical to many of the processes in which HEPA filtration is used, such as semiconductor manufacturing and bio cleanrooms. In such applications, particulate material in the air is occasionally responsible for product defects or loss of containment of substances within the cleanroom. Instability of performance of the HEPA filters used in these applications is not acceptable.

Nonwoven filter elements can be used as surface loading media in HEPA filtration. The media are generally constructed to be permeable to gas flow, and to also have a sufficiently fine pore size and appropriate porosity to inhibit the passage of particles greater than a selected size therethrough. As particulate materials pass through the filter, the upstream side of the filter operates through diffusion and interception to capture and retain selected sized particles from the gas stream. The particles are collected to form a "dust cake" on the upstream side of the filter, and within the filter.

Currently, commercial HEPA filtration media fall into the categories of microglass fibers and blends of microglass, and electrostatically treated (also known as "electret") high basis weight meltblown webs laminated to pleatable substrates. Each of these classes of filtration media has its limitations.

HEPA media utilizing microglass fibers and blends containing microglass fibers typically contain small diameter glass fibers arranged in either a woven or nonwoven structure, having substantial resistance to chemical attack and relatively small porosity. Such glass fiber media are disclosed in the following U.S. Patents: Smith et al., U.S. Pat. No. 2,797,163; Waggoner, U.S. Pat. No. 3,228,825; Raczek, U.S. Pat. No. 3,240,663; Young et al., U.S. Pat. No. 3,249,491; Bodendorf et al., U.S. Pat. No. 3,253,978; Adams, U.S. Pat. No. 3,375,155; and Pews et al., U.S. Pat. No. 3,882,135. Microglass fibers and blends containing microglass fibers have the limitation that they are typically relatively brittle when pleated, and produce undesirable yield losses as HEPA filters are required to be 100% inspected. Spot repairs are a tedious manual process.

Electrostatically treated meltblown webs, as described in U.S. Pat. Nos. 4,874,659 and 4,178,157, perform well initially, but are subject to performance drops as the media begin to capture particles and the electrostatic charge becomes insulated. U.S. Pat. Nos. 4,874,659 and 4,178,157 both disclose HEPA air filter media characterized by lower pressure drop in a range of 5-10 mm $H_2O$ (water column). These filters are made of nonwoven web (U.S. Pat. No. 4,874,659) or sliced films (U.S. Pat. No. 4,178,157) made of polyolefins, such as polyethylene or polypropylene, which are partially melted by heating to about 100° C. and are thereafter subjected to an electrical field which electrically charges the polymer. The charge imparted provides these filters with the high efficiency particulate air qualities. Such filters suffer a few limitations. First, being based on the electrical charge for effective capture of particulates, the performances of such filters are greatly influenced by air humidity, causing charge dissipation. Second, due to their mode of action and to being relatively thin, such filters are characterized by low dust load (the weight of dust per area of filter causing a two fold increase in pressure drop) per filter weight per area ratio of about 0.8, wherein typically the dust load of such filters is about 50-80 $g/m^2$ and their weight per area is about 80-130 $g/m^2$.

U.S. Pat. No. 6,604,925 discloses filtration media suitable for HEPA and a device and method for making the media by electrostatically spinning fine fibers through a nozzle to form a fibrous structure on a moving precipitation electrode, and then filling the pores of the fibrous structure with aerosol particles.

U.S. Patent Application Publication US 2004/0038014 A1 discloses filtration media including nanofiber layers for various applications including filtration of gas and liquids containing particle contaminants, and processes for making the media. PCT International Publication Numbers WO 02/20132 A2 and WO 02/20133 A2 disclose filtration media including low basis weight layers of nanofibers for various applications including filtration of air containing particle contaminants, and processes for making the media. These publications do not disclose high efficiency particulate air filter media or a process for achieving high efficiency air filtration.

It would be desirable to provide a means for achieving HEPA level air filtration while avoiding the above-listed limitations of known filtration media.

SUMMARY OF THE INVENTION

In a first embodiment, the present invention is directed to filtration media comprising at least one nanofiber layer of continuous polymeric fibers sandwiched between two scrim layers, wherein the continuous polymeric fibers of the nanofiber layer have a diameter less than about 1000 nanometers and wherein the nanofiber layer has a basis weight of between about 25 $g/m^2$ and about 60 $g/m^2$ and a solids volume fraction of between about 0.10 and about 0.30 and a thickness of greater than 100 µm.

A second embodiment of the present invention is directed to a process for filtering particulate matter from an air stream comprising passing the air stream through substantially electrically neutral filter media comprising at least one nanofiber layer of continuous polymeric fibers sandwiched between two scrim layers, wherein the continuous polymeric fibers of the nanofiber layer have a diameter less than about 1000 nanometers and wherein the nanofiber layer has a basis weight of between about 25 $g/m^2$ and about 60 $g/m^2$ and wherein the thickness of the nanofiber layer is greater than about 100 µm and no greater than about 265 µm.

DEFINITIONS

The terms "high efficiency particulate air" and "HEPA" are used interchangeably to describe filtration media capable of filtering out 99.97% of 0.3 µm particles in air flowing at 5.33 cm/sec face velocity.

The term "nanofibers" refers to fibers having diameters of less than 1,000 nanometers.

The term "filter media" or "media" refers to a material or collection of material through which a particulate-carrying fluid passes, with a concomitant and at least temporary deposition of the particulate material in or on the media.

BRIEF DESCRIPTION OF THE DRAWINGS

The accompanying drawings, which are incorporated in and constitute a part of this specification, illustrate the presently contemplated embodiments of the invention and, together with the description, serve to explain the principles of the invention.

FIG. 1 is an illustration of a prior art apparatus for forming nanofibers suitable for use in the present invention.

DETAILED DESCRIPTION OF THE INVENTION

Figure 1:
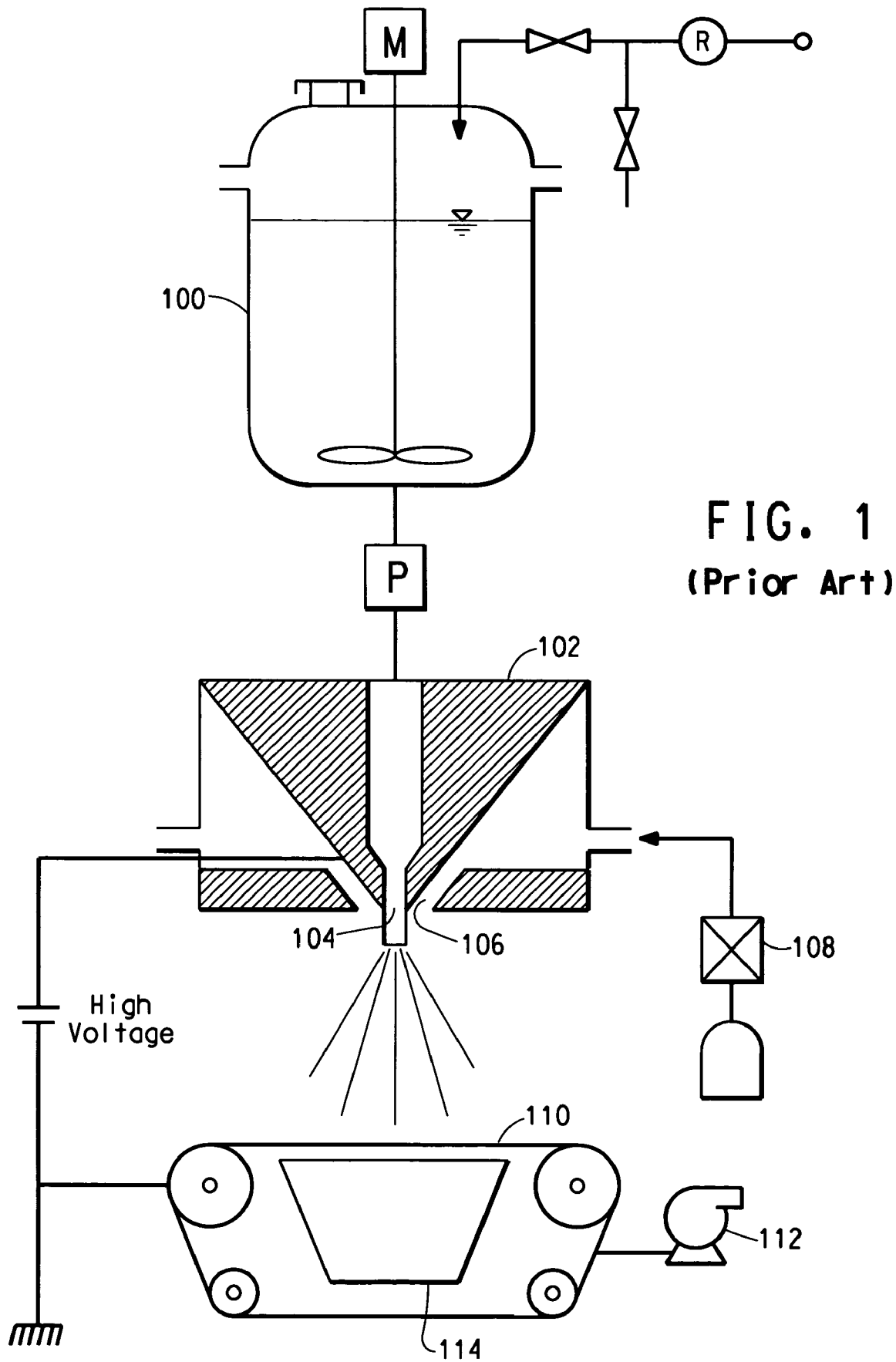

Reference will now be made in detail to the presently preferred embodiments of the invention, examples of which are illustrated in the accompanying drawings. Throughout the drawings, like reference characters are used to designate like elements.

The invention relates to a filter medium comprising at least one nanofiber layer sandwiched between two scrim layers. The nanofiber layer comprises a collection of substantially continuous organic polymeric nanofibers in a filtration medium layer, the nanofibers having a diameter less than about 1 µm or 1000 nm, advantageously between about 100 nm and 700 nm, or even between about 300 nm and 650 nm. Such filter media can be used in high efficiency air filtration applications for removing particulate material from a fluid stream, in particular, particulate material from a gaseous stream such as air.

Filtration media capable of HEPA level performance can be made by sandwiching one or more nanofiber layers between two scrim layers, the nanofiber layer having a basis weight between about 25 g/m$^2$ and about 60 g/m$^2$, advantageously between about 27 g/m$^2$ and about 60 g/m$^2$, or even between about 30 g/m$^2$ and about 49 g/m$^2$.

The nanofiber layer has a solids volume fraction of between about 0.10 and about 0.30, advantageously between about 0.25 and about 0.28. Increasing the solids volume fraction permits a reduction in layer thickness without substantial reduction in efficiency or other filter properties. Increasing the solids volume fraction, at constant layer thickness, reduces pore size and increases particulate storage. The thickness of the nanofiber layer can vary depending on the density of the nanofiber polymer. In the media of the invention, the nanofiber layer has a thickness of greater than about 100 µm, advantageously greater than about 100 µm and no greater than about 265 µm, and more advantageously greater than about 100 µm and no greater than about 150 µm, such as between about 104 µm and 147 µm.

The nanofiber layer in the present invention may be made in accordance with the barrier webs disclosed in PCT Patent Publication Number WO 04/027140A, which is incorporated herein by reference.

The layers of the filter media are advantageously joined by adhesive lamination with carrier layers (referred to herein as "scrims").

The nanofiber layer is made up of substantially continuous polymeric fibers having a diameter less than 1000 nm, advantageously between about 100 nm and about 700 nm, or even between about 300 nm and 650 nm. The continuous polymeric fibers of the nanofiber layer can be formed by any process capable of making continuous fibers in this diameter range, including electrostatic spinning or electroblowing. A process for forming nanofibers via electroblowing is disclosed in PCT Patent Publication Number WO 03/080905A, which is incorporated herein by reference. WO 03/080905A discloses an apparatus and method for producing a nanofiber web, the apparatus shown in FIG. 1. The method comprises feeding a stream of polymeric solution comprising a polymer and a solvent from a storage tank 100 to a spinning nozzle 104 (also referred to as a "die") within a spinneret 102 to which a high voltage is applied through which the polymeric solution is discharged. Meanwhile, compressed air that is optionally heated in air heater 108, is issued from air nozzles 106 disposed in the sides or the periphery of spinning nozzle 104. The air is directed generally downward as a blowing gas stream which envelopes and forwards the newly issued polymeric solution and aids in the formation of the fibrous web, which is collected on a grounded porous collection belt 110 above a vacuum chamber 114, which has vacuum applied from the inlet of air blower 112.

The media of the invention can be made by forming nanofibers into a relatively thick layer in a single pass or by building up the thickness of the media using multiple passes in an electroblowing process.

The polymeric filter media of the invention are made from organic polymer materials.

Advantageously, the scrim layers are spunbond nonwoven layers, but can be made from carded webs of nonwoven fibers and the like. The scrim layers require sufficient stiffness to hold pleats and dead folds.

The media of the invention can be fabricated into any desired filter format such as cartridges, flat disks, canisters, panels, bags and pouches. Within such structures, the media can be substantially pleated, rolled or otherwise positioned on support structures. The filtration media of the invention can be used in virtually any conventional structure including flat panel filters, oval filters, cartridge filters, spiral wound filter structures and can be used in pleated, Z filter or other geometric configurations involving the formation of the media to useful shapes or profiles. Advantageous geometries include pleated, cylindrical patterns. Such cylindrical patterns are generally preferred because they are relatively straightforward to manufacture, use conventional filter manufacturing techniques, and are relatively easy to service. Pleating of media increases the media surface area within a given volume. Generally, major parameters with respect to such media positioning are: pleat depth; pleat density, typically measured as a number of pleats per inch along the inner diameter of the pleated media cylinder; and, cylindrical length or pleat length. In general, a principal factor with respect to selecting media pleat depth, pleat length, and pleat density, especially for barrier arrangements is the total surface area required for any given application or situation. Such principles would apply, generally, to media of the invention and preferably to similar barrier type arrangements.

The filter media of the invention can be used for the removal of a variety of particulate matter from fluid streams. The particulate matter can include both organic and inorganic contaminants. Organic contaminants can include large particulate natural products, organic compounds, polymer particulate, food residue and other materials. Inorganic residue can include dust, metal particulate, ash, smoke, mist and other materials.

The initial pressure drop (also referred to herein as "pressure drop" or "pressure differential") of the filter media is advantageously not above about 60 mm H$_2$O, more advantageously between about 30 mm H$_2$O and about 50 mm H$_2$O. The pressure drop across a filter increases over time during use, as particulates plug the filter. Assuming other variables to be held constant, the higher the pressure drop across a filter, the shorter the filter life. A filter typically is determined to be in need of replacement when a selected limiting pressure drop across the filter is met. The limiting pressure drop varies depending on the application. Since this buildup of pressure is a result of dust (or particulate) load, for systems of equal efficiency, a longer life is typically directly associated with higher load capacity. Efficiency is the propensity of the media to trap, rather than to pass, particulates. In general the more efficient filter media are at removing particulates from a gas flow stream, the more rapidly the filter media will approach the "lifetime" pressure differential, assuming other variables to be held constant. On the other hand, the higher air permeability of the filter media, the lower the pressure drop, therefore the longer the filter life, assuming other variables to be held constant. Advantageously, the Frazier air permeability of the filter media of the invention is between about 0.3 m$^3$/min/m$^2$ and about 3.0 m$^3$/min/m$^2$, advantageously between about 0.77 m$^3$/min/m$^2$ and 1.2 m$^3$/min/m$^2$.

The filter media of the present invention are advantageously substantially electrically neutral and therefore are much less affected by air humidity as compared with the filters disclosed in U.S. Pat. Nos. 4,874,659 and 4,178,157, described above, which owe their performances to the charges associated therewith. By "substantially electrically neutral" is meant that the media do not carry a detectable electrical charge.

Test Methods

Filtration Efficiency was determined by a Fractional Efficiency Filter Tester Model 3160 commercially available from TSI Incorporated (St. Paul, Minn.). The desired particle sizes of the challenge aerosol particles were entered into the software of the tester, and the desired filter flow rate was set. A volumetric airflow rate of 32.4 liters/min and a face velocity of 5.33 cm/sec were used. The test continued automatically until the filter was challenged with every selected particle size. A report was then printed containing filter efficiency data for each particle size with pressure drop. The sample of Example 5 was tested using Fractional Efficiency Filter Tester Model 8130 commercially available from TSI Incorporated (St. Paul, Minn.). See Example 5 for testing conditions used.

Pressure Drop was reported by the Fractional Efficiency Filter Tester Model 3160 commercially available from TSI Incorporated (St. Paul, Minn.). The testing conditions are described under the Filtration Efficiency test method. Pressure drop is reported in mm of water column, also referred to herein as mm H$_2$O.

Basis weight was determined by ASTM D-3776, which is hereby incorporated by reference and reported in g/m$^2$.

Thickness was determined by ASTM D177-64, which is hereby incorporated by reference, and is reported in micrometers.

Solids volume fraction of a nanofiber layer sample was calculated by dividing the basis weight of the sample in g/m$^2$ by the nanofiber polymer density in g/cm$^3$ and by the layer thickness in micrometers, i.e., solids volume fraction=basis weight/(density×thickness).

Fiber Diameter was determined as follows. Ten scanning electron microscope (SEM) images at 5,000× magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average fiber diameter for each sample was calculated.

EXAMPLES 1-4

Nanofiber layers were made by electroblowing a solution of DuPont Nylon 66-FE 3218 polymer having a density of 1.14 g/cc (available from E. I. du Pont de Nemours and Company, Wilmington, Del.) at 24 weight percent in formic acid at 99% purity (available from Kemira Oyj, Helsinki, Finland). The polymer and solvent were fed into a solution mix tank, the solution transferred into a reservoir and metered through a gear pump to an electroblowing spin pack having spinning nozzles, as described in PCT Patent Publication No. WO 03/080905. The spin pack was 0.75 meter wide and had 76 spinning nozzles. The pack was at room temperature with the pressure of the solution in the spinning nozzles at 10 bar. The spinneret was electrically insulated and applied with a voltage of 75 kV. Compressed air at a temperature of 44° C. was injected through air nozzles into the spin pack at a rate of 7.5 m$^3$/minute and a pressure of 660 mm H$_2$O. The throughput of the solution was 2 cc/hole/mm. The fibers exited the spinning nozzles into air at atmospheric pressure, a relative humidity of 65-70% and a temperature of 290° C. The fibers were laid down 310 mm below the exit of the pack onto a porous belt moving at 5-12 m/minute. A vacuum chamber pulling a vacuum of 100-170 mm H$_2$O beneath the porous belt assisted in the laydown of the fibers. The nanofiber layer samples were made without a scrim, by depositing the fibers directly onto the belt. The nanofiber layer samples were then laminated to scrim layers by applying adhesive with a gravure roll applicator. A resin bonded carded nonwoven material obtained from Ok Soo Company (S. Korea) was used as the scrim.

EXAMPLE 1 (COMPARATIVE)

The above described process was followed. The porous collection belt was moving at 5.7 m/minute. The vacuum chamber pulled a vacuum of 100 mm H$_2$O beneath the porous belt.

A 110 m long sample was made by making two layers of continuous nanofibers having a nominal (target) 10.0 g/m$^2$ basis weight each, resulting in a total measured basis weight as set forth in Table 1. The fibers in the web formed had an average diameter of about 420 nm. The filtration efficiency was tested at various particle size challenges, and the results are given in Table 2. Pressure Drop (mm of water) was also measured and the results are given in Table 3.

EXAMPLE 2

The above described process was followed. The porous collection belt was moving at 11-3 m/minute. The vacuum chamber pulled a vacuum of 140 mm H$_2$O beneath the porous belt.

A 60 m long sample was made by making two layers of continuous nanofibers having a nominal 10.0 g/m$^2$ basis weight each, then one layer of nanofibers having a nominal basis weight of 5.0 g/m$^2$, resulting in a total measured basis weight as set forth in Table 1. The fibers in the web formed had an average diameter of about 375 nm. The filtration efficiency was tested at various particle size challenges, and the results are given in Table 2. Pressure Drop (mm of water) was also measured and the results are given in Table 3.

EXAMPLE 3

The above described process was followed. The porous collection belt was moving at 11.3 m/minute. The vacuum chamber pulled a vacuum of 160 mm Hg beneath the porous belt.

A 60 m long sample was made by making two layers of continuous nanofibers having a nominal 10.0 g/m$^2$ basis weight each, then two layers of nanofibers having a nominal basis weight of 5.0 g/m² each, resulting in a total measured basis weight as set forth in Table 1. The fibers in the web formed had an average diameter of about 368 nm. The filtration efficiency was tested at various particle size challenges, and the results are given in Table 2. Pressure Drop (mm of water) was also measured and the results are given in Table 3.

EXAMPLE 4

The above described process was followed. The porous collection belt was moving at 5.7 m/minute. The vacuum chamber pulled a vacuum of 170 mm H₂O beneath the porous belt.

A 60 m long sample was made by making two layers of continuous nanofibers having a nominal 10.0 g/m² basis weight each, then three layers of nanofibers having a nominal basis weight of 5.0 g/m² each, resulting in a total measured basis weight as set forth in Table 1. The fibers in the web formed had an average diameter of about 432 nm. The filtration efficiency was tested at various particle size challenges, and the results are given in Table 2. Pressure Drop (mm of water) was also measured and the results are given in Table 3.

EXAMPLE 5

Filtration media were made by hand laying 16 separate nylon 6,6 nanofiber layers between two spunbond layers. The total measured basis weight of the nanofiber layers was 49 g/m². The nanofibers had an average diameter of about 651 nm.

The filtration efficiency was tested using a Fractional Efficiency Filter Tester Model 8130 (commercially available from TSI Incorporated) using a particle challenge of 0.236 µm, a volumetric air flow rate of 32.4 liters/min and a face velocity of 5.33 cm/sec. A filtration efficiency of 99.998% and a pressure drop of 56.4 mm H₂O were reported.

TABLE 1

Media Properties

| Example | Frazier Air Permeability (m³/min/m²) | Thickness (µm) | Basis Weight (g/m²) | Solids Volume Fraction |
|---|---|---|---|---|
| 1 (Comparative) | 1.6 | 79 | 23 | 0.25 |
| 2 | 1.2 | 104 | 29 | 0.25 |
| 3 | 0.97 | 117 | 38 | 0.28 |
| 4 | 0.76 | 147 | 44 | 0.26 |
| 5 | 0.77 | 203 | 49 | 0.21 |

TABLE 2

Percent Efficiency

| Particle size (Micron) | (Comparative) Example 1 | Example 2 | Example 3 | Example 4 |
|---|---|---|---|---|
| 0.1 | 99.01 | 99.8 | 99.96 | 99.984 |
| 0.12 | 98.9 | 99.79 | 99.957 | 99.982 |
| 0.2 | 99.2 | 99.87 | 99.977 | 99.9904 |
| 0.25 | 99.48 | 99.93 | 99.988 | 99.9957 |
| 0.3 | 99.67 | 99.962 | 99.9944 | 99.9979 |
| 0.35 | 99.79 | 99.979 | 99.9976 | 99.999 |
| 0.4 | 99.86 | 99.989 | 99.9984 | 99.99975 |
| 0.5 | 99.919 | 99.9927 | 99.9988 | 99.99943 |
| 0.6 | 99.945 | 99.9942 | 99.99962 | 99.99981 |
| 0.7 | 99.949 | | 99.99952 | 99.99954 |
| 0.8 | 99.976 | | 99.9986 | 99.9987 |

TABLE 3

Pressure Drop (mm H₂O)

| (Comparative) Example 1 | Example 2 | Example 3 | Example 4 |
|---|---|---|---|
| 21.4 | 32.7 | 42.4 | 46.2 |

We claim:

1. Filtration media comprising at least one nanofiber layer of continuous polymeric fibers sandwiched between two scrim layers, wherein the continuous polymeric fibers of the nanofiber layer have a diameter less than about 1000 nanometers and wherein the nanofiber layer has a basis weight of between about 25 g/m² and about 60 g/m² and a solids volume fraction of between about 0.10 and about 0.30 and a thickness of greater than 100 µm.

2. The filtration media of claim 1 wherein the filtration media is electrically neutral.

3. The filtration media of claim 1 wherein the filtration media are capable of filtering out at least 99.97% of 0.3 µm particles in air flowing at a face velocity of 5.33 cm/sec.

4. The filtration media of claim 1 wherein the nanofiber layer has a basis weight of between about 30 g/m² and about 49 g/m².

5. The filtration media of claim 1 wherein the nanofiber layer has a thickness of no greater than about 265 µm.

6. The filtration media of claim 1 wherein the nanofiber layer has a thickness of no greater than about 150 µm.

7. The filtration media of claim 1 wherein the thickness of the nanofiber layer is between about 104 µm and about 147 µm.

8. The filtration media of claim 1 wherein the continuous polymeric fibers of the nanofiber layer have a diameter of between about 100 nanometers and 700 nanometers.

9. The filtration media of claim 1 wherein the continuous polymeric fibers of the nanofiber layer have a diameter of between about 300 nanometers and 650 nanometers.

10. The filtration media of claim 1 wherein the scrim layers are spunbond nonwoven webs or carded nonwoven webs.

11. The filtration media of claim 1 wherein the pressure drop is no greater than about 60 mm H₂O.

12. The filtration media of claim 1 wherein the pressure drop is between about 30 mm H₂O and about 50 mm H₂O.

13. The filtration media of claim 1 wherein the nanofiber layer has a solids volume fraction of between about 0.25 and about 0.28.

14. The filtration media of claim 1 wherein the media have a Frazier air permeability of between about 0.3 m³/min/m² and about 3.0 m³/min/m².

15. The filtration media of claim 1 wherein the media have a Frazier air permeability of between about 0.77 m³/min/m² and about 1.2 m³/min/m².

16. A process for filtering particulate matter from an air stream comprising passing the air stream through substantially electrically neutral filter media comprising at least one nanofiber layer of continuous polymeric fibers sandwiched between two scrim layers, wherein the continuous polymeric fibers of the nanofiber layer have a diameter less than about 1000 nanometers and wherein the nanofiber layer has a basis weight of between about 25 g/m² and about 60 g/m² and wherein the thickness of the nanofiber layer is greater than about 100 μm and no greater than about 265 μm.

17. The process of claim 16 wherein at least 99.97% of particles 0.3 μm and larger are filtered out of the air stream wherein the air stream flows at a face velocity of 5.33 cm/sec.

18. The process of claim 16 wherein the pressure drop of the filter media is no greater than about 60 mm H₂O.

19. The process of claim 16 wherein the pressure drop of the filter media is between about 30 mm H₂O and about 50 mm H₂O.

\* \* \* \* \*